"UNITED STATES PATENT OFFICE.

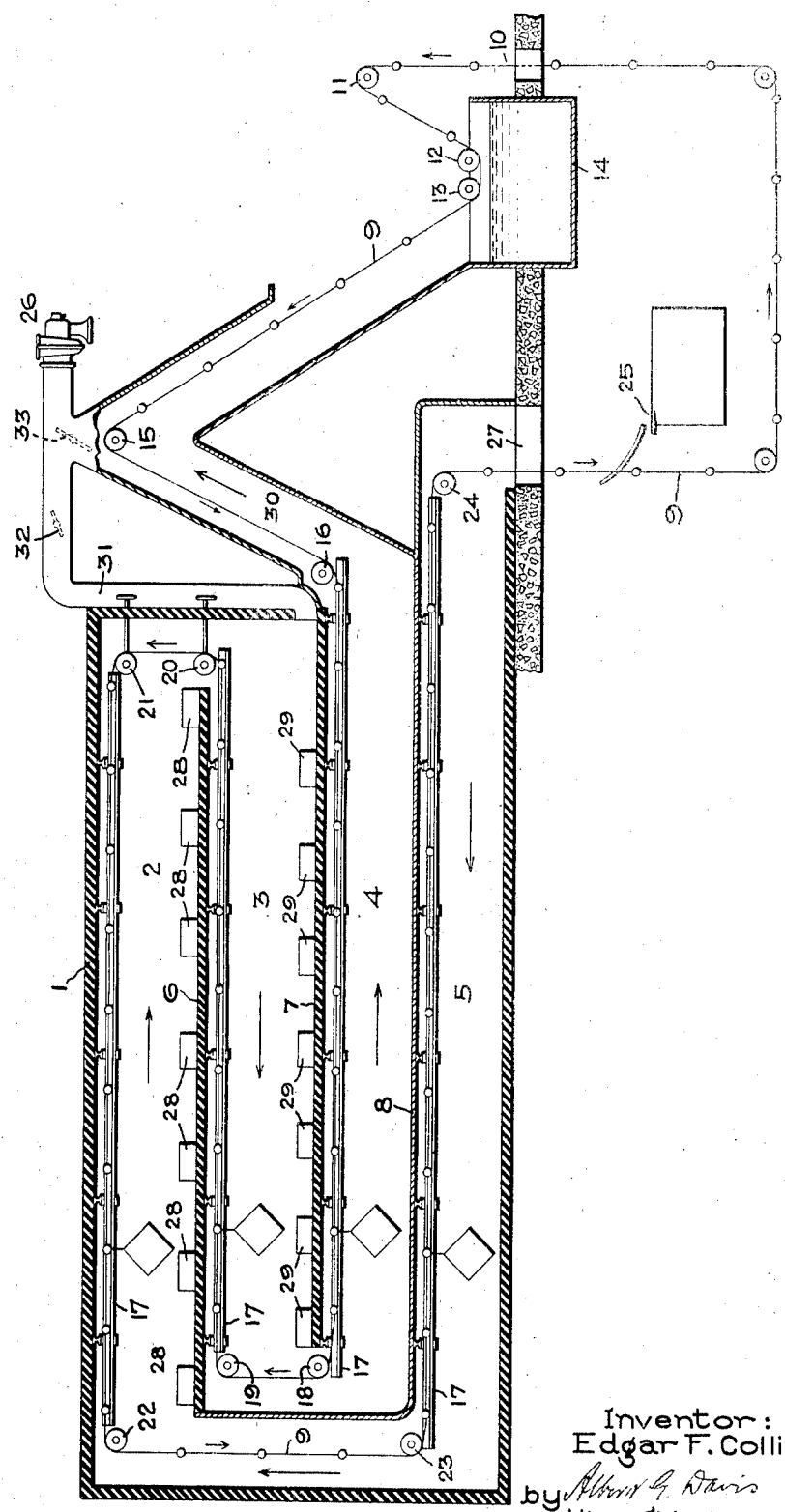

EDGAR FRANCIS COLLINS, OF SCHENECTADY, NEW YORK, ASSIGNOR TO GENERAL ELECTRIC COMPANY, A CORPORATION OF NEW YORK.

OVEN.

1,334,840.

Specification of Letters Patent.

Patented Mar. 23, 1920.

Application filed September 29, 1917. Serial No. 194,073.

*To all whom it may concern:*

Be it known that I, EDGAR F. COLLINS, a citizen of the United States, residing at Schenectady, in the county of Schenectady, State of New York, have invented certain new and useful Improvements in Ovens, of which the following is a specification.

My present invention relates to an oven which is particularly adapted for baking articles which are coated with japan or similar material.

The object of my invention is to provide a continuously operating oven in which the heat supplied thereto will be utilized to the best possible advantage in baking the coating upon the articles placed in the oven and in which the articles will be cooled to such an extent that they may be conveniently handled before removing them from the oven.

The novel features which I believe to be characteristic of my invention are set forth with particularity in the appended claims. The invention itself, however, both as to its organization and method of operation will be best understood by reference to the following description taken in connection with the accompanying drawing in which I have shown partly in cross-section and partly diagrammatically an oven constructed in accordance with my invention.

As indicated in the drawing the oven comprises a casing 1 which is divided into four compartments, 2, 3, 4 and 5, by horizontal partitions 6, 7 and 8. Articles which are to be baked in the oven are carried into and through the oven by means of the endless conveyer 9 which moves through the oven in the direction indicated by the small arrows. The articles which are to be baked are loaded onto the conveyer at the point 10 in any convenient way, the conveyer passing from this point upward over the pulley 11 and thence downward under the pulleys 12 and 13. Articles suspended from the conveyer are thus dipped into the vat 14 containing the japan or other material with which they are to be coated. From the vat 14 the conveyer passes upward over the pulley 15 and thence downward under the pulley 16 into the chamber 4 which for convenience of description I term the "preheat" chamber. The conveyer is supported in this and the succeeding chambers through which it passes upon the rails 17. From the chamber 4 the conveyer passes over the pulleys 18 and 19 into the chamber 3 which I term the "low-heat" chamber. From the low-heat chamber the conveyer passes over the pulleys 20 and 21 into the chamber 2 which I term the "high-heat" chamber. From the chamber 2 the conveyer passes downward over the pulleys 22 and 23 into the chamber 5 which is the cooling chamber. From this chamber the conveyer moves downward over pulley 24 and the articles which have been baked may be removed from the conveyer upon the unloading platform 25. In order to provide a circulation of air through the oven a blower 26 may be employed to draw air through the oven, the air being caused to flow in the directions as indicated by the large arrows. Fresh cool air is drawn into chamber 5, through the opening 27, and this cool air is heated by passing over the articles which have traveled through the chambers 4, 3 and 2. The heat from these articles is also radiated and supplied to some extent through the partition 8 to chamber 4. The partially heated air from chamber 5 is drawn upward into the high-heat chamber 2 which is provided with heaters 28 of any desired form for heating it to the desired temperature. From chamber 2 the heated air passes down into chamber 3 which is also provided with heaters 29, which are preferably of such a capacity as to heat this chamber to a lower temperature than that maintained in chamber 2. The heated air from chamber 3 passes on to the pre-heat chamber and gives up a large amount of its heat to the cooled articles going into the oven from the vat 14. The air from chamber 4 is drawn out through the passage 30 by means of the blower 26 and discharged therefrom in any desired way. A passage 31 may also be provided communicating with chamber 3 for drawing air from that chamber if desired, dampers 32 and 33 being arranged so as to draw air from either chamber 3 or chamber 4, or both, as may be desired.

It will be seen from the above description that the arrangement which I have provided is of special advantage in utilizing the heat furnished to the oven by the heaters 28 and 29. The articles which pass through the oven give up a large amount of their heat before coming out and hence are comparatively cool when removed from the oven. The heated air which is drawn from the oven is also utilized for preheating the cooled articles coming in so that when air is discharged from the oven it is also comparatively cool. In this way the amount of heat which is wasted in the operation of the oven is reduced to a minimum.

What I claim as new and desire to secure by Letters Patent of the United States, is:

1. The combination in an apparatus of the class described of an oven divided into a plurality of compartments means for maintaining said compartments at different temperatures, means for conveying articles through the different compartments of said oven successively in such a way that the temperature to which they are subjected will gradually increase until they pass into the compartment which is maintained at the highest temperature and that they will pass from that compartment to a compartment which is maintained at a much lower temperature and means for producing a circulation of air through the oven in such a way that the heated articles in the last compartment will be cooled by fresh air coming into the oven and the cool articles coming into the oven will be heated by heated air passing out of the oven.

2. The combination in an apparatus of the class described of an oven, means for conveying articles through said oven, means for heating different portions of said oven to different temperatures and means for creating a circulation of air through said oven in such a way that heated articles passing out of said oven will be cooled by fresh air coming in and cool articles passing into said oven will be heated by heated air passing out of said oven.

3. The combination in an apparatus of the class described of an oven divided into a plurality of compartments means for heating part of said compartments, means for conveying articles through the compartments of said oven successively in such a way that after passing through the heated compartments they will pass through a compartment which is not provided with heating means, the last named compartment being located adjacent another compartment so that heat will be given up by the heated articles and supplied to said adjacent compartment.

4. The combination in an apparatus of the class described of an oven which is divided into a plurality of compartments by means of horizontal partitions, means for heating at least one of said compartments at the top of the oven and means for conveying articles successively through the different compartments of said oven beginning with the compartment immediately above the bottom compartment, in such a way that after passing through the top compartment of said oven they will pass through the bottom compartment and there give up heat to the compartment immediately above the bottom.

5. The combination in an apparatus of the class described of an oven which is divided into a plurality of compartments by means of horizontal partitions, means for heating at least one of said compartments at the top of the oven and means for conveying articles successively through the different compartments of said oven beginning with the compartment immediately above the bottom compartment, in such a way that after passing through the top compartment of said oven they will pass through the bottom compartment and there give up heat to the compartment immediately above the bottom, and means for creating a circulation of air through the compartments of said oven in such a way that cool air will first enter the bottom compartment of the oven and pass out of the oven from the compartment immediately above the bottom.

6. The combination in an apparatus of the class described of an oven which is divided into at least three compartments by means of horizontal partitions and means for creating a circulation of air through the compartments of said oven in such a way that the air will first enter and flow through the bottom compartment of the oven and pass out of the oven from the compartment immediately above the bottom.

7. The combination in an apparatus of the class described of an oven which is divided into a plurality of compartments by means of horizontal partitions, a conveyer arranged to pass successively through the compartments of said oven beginning with the one immediately above the bottom and ending with the bottom compartment, means for heating the compartments of said oven above the one through which the conveyer first passes, and means for producing a circulation of air through the compartments of said oven in a direction opposite to that in which the conveyer moves.

In witness whereof, I have hereunto set my hand this 28th day of September, 1917.

EDGAR FRANCIS COLLINS.